Patented Sept. 23, 1952

2,611,796

UNITED STATES PATENT OFFICE 2,611,796

CIRCUIT BREAKER CONTROL

Amado Conangla, Sharon Hill, Pa., assignor to I-T-E Circuit Breaker Company, Philadelphia, Pa., a corporation of Pennsylvania Application July 13, 1951, Serial No. 236,675

13 Claims. (Cl. 171—97)

My invention relates to circuit breaker control systems and more particularly to circuit breaker control systems in which circuit means are provided for transferring the loads from a normal to an emergency source in case of failure of the normal source of power and for making selective control by the operator of essential loads to be supplied with power from the emergency source.

In order to provide continuity of electric power supply loads, it has heretofore been the practice to provide an emergency source of power which can automatically be switched into service when for any reason the normal source of power fails. Such an emergency source, however, does not in some instances have the available power necessary for feeding all the loads that may exist at the time that the switch-over to the emergency source takes place. It is accordingly desirable that together with the provision for the means for switching to the emergency source provision be made for automatically reducing the power load to an amount which the emergency source can feed.

It is further desirable that the operator control at his discretion which of the particular loads shall receive the available emergency power and which ones shall be temporarily cut off from the source of power.

In general, my invention contemplates a circuit breaker arrangement in which, when the circuit breaker to the main source of power opens and the circuit breaker to the emergency source of power is closed, the trip magnets of non-essential feeder circuit breakers are energized to trip their respective circuit breakers. The circuits to the trip magnets are only closed long enough to complete the tripping of the circuit breaker and are then deenergized to permit independent or selective reclosing of these non-essential circuit breakers.

Accordingly, an object of my invention is to provide a novel circuit breaker control system for switching to an emergency source of power.

A further object of my invention is to provide a novel circuit breaker control system for switching to an emergency source of power and simultaneously reducing the load in accordance with the available power from said source.

Still another object of my invention is to provide a novel circuit arrangement for power systems in which an emergency source is automatically connected in a system when the normal source fails and in which the operator may selectively determine which loads shall receive such power.

Figure 1:
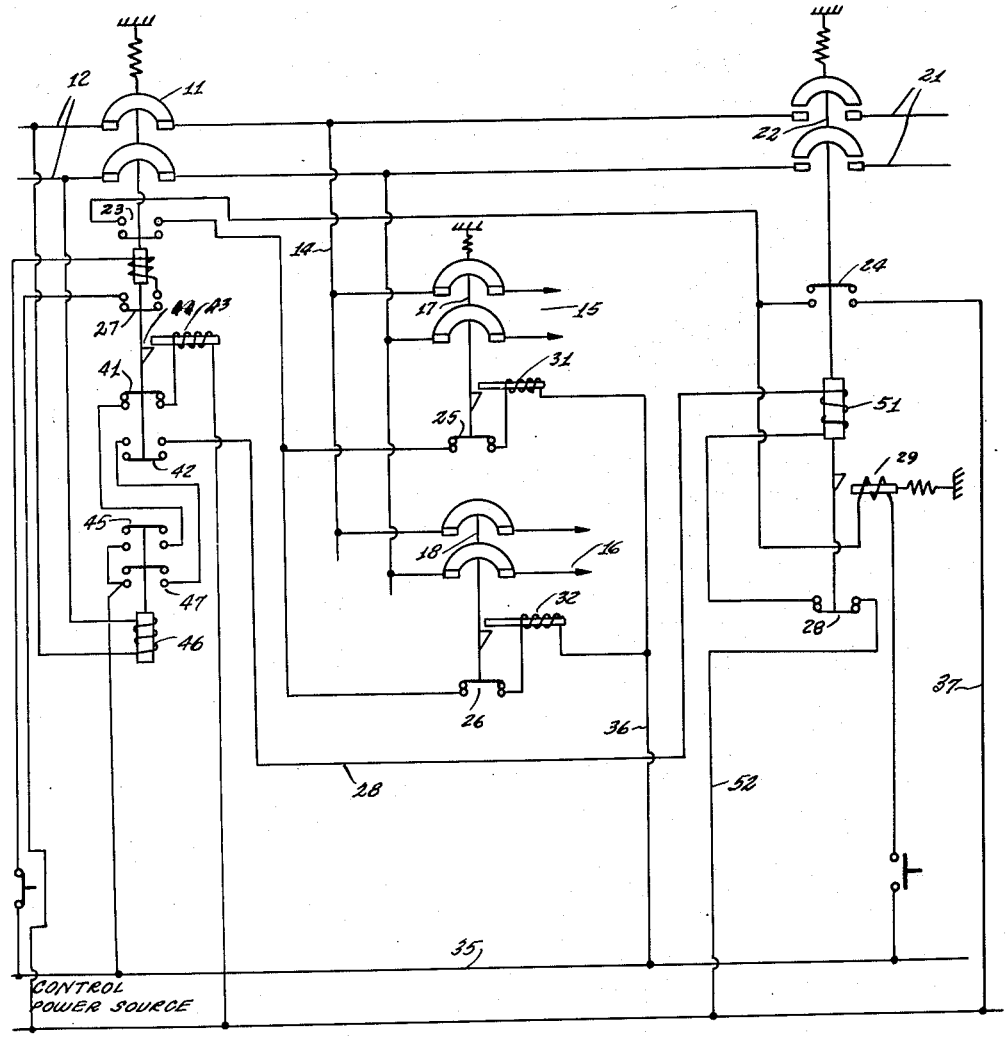

These and other objects of my invention will be more clearly understood from the detailed description which is to follow in connection with the drawing in which Figure 1 is a schematic diagram showing one form of my invention.

Figure 2:
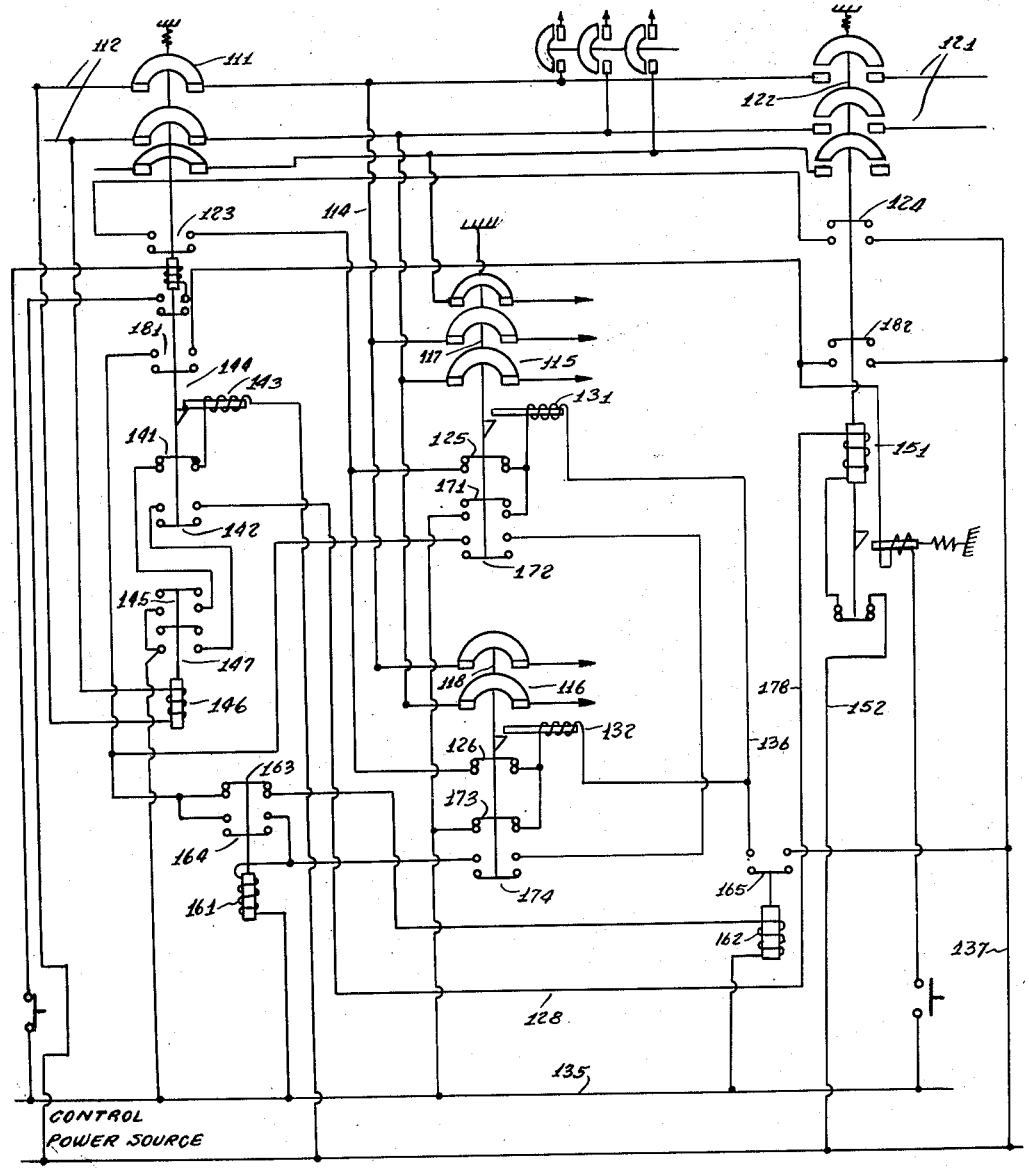

Figure 2 is a schematic diagram of an improved form of my invention.

Referring to Figure 1 I have shown a circuit breaker 11 which connects a main source of power (not shown) feeding over line 12 to the bus 14. Connected to the bus 14 are a series of loads 15 and 16, protected by individual circuit breakers 17 and 18 respectively. Although only two loads are here illustrated, it will be understood, of course, that there may be many other loads. In the illustration here provided the loads 15 and 16 are designated as the non-essential loads and other loads which are essential will, it will be understood, be connected to feeder 14 or a similar feeder remaining unaffected by the operations to be described.

An emergency source of power feeding over the line 21 is provided with an emergency power supply circuit breaker 22 which, when closed, will feed power to the bus 14.

The circuit breaker 11 is provided with a pair of auxiliary contacts 23 which are closed when the circuit breaker 11 is open and are open when the circuit breaker 11 is closed. Circuit breaker 22 is provided with a pair of auxiliary contacts 24 which are closed when the circuit breaker 22 is closed and open when the circuit breaker 22 is open. Circuit breakers 17 and 18 are each provided with auxiliary contacts 25, 26, respectively, which are closed when the respective circuit breakers are closed and open when the respective circuit breakers are open. Closing of circuit breaker 11 is achieved by closing magnet 27 over auxiliary contacts 25, closed when the circuit breaker is open and opened when the circuit breaker is fully closed.

Circuit breakers 17 and 18 are also provided with latching mechanisms for holding the respective circuit breakers in contact engagement position against individual biasing springs in a manner well known in the art, until these latches are released by the energization of their individual trip magnets 31 and 32. It will be understood that all the circuit breakers here shown are schematically illustrated and are provided with the usual closing and tripping mechanism, as for example, illustrated in Patent 2,348,228.

A control source of power 35 feeds energy over the conductors 36 and 37 for the operating mechanisms of the circuit breakers, as will now be described.

The circuit breaker 11, in addition to the auxiliary contacts 23, is provided with auxiliary contacts 41, which are normally closed when the circuit breaker is closed and open when the circuit breaker is open. The circuit breaker is also provided with a second set of auxiliary contacts 42 which are open when the circuit breaker is closed and closed when the circuit breaker is open. The auxiliary contacts 41 are connected to the winding of a trip device 43 which is provided with a plunger engaging a latch 44 on the circuit breaker 11. Auxiliary contacts 41 are also connected to the contacts 45 of an undervoltage relay 46 connected across the normal supply source at buses 12. The undervoltage relay 46 is also supplied with contacts 47 which are connected at one terminal to the control power source 35 and at the opposite terminal to the auxiliary contacts 42 of circuit breaker 11. Manual tripping of circuit breaker 22 is effected by energization of relay 29. The auxiliary contacts 42 are connected over a conductor 28 to a closing magnet coil 51 of the circuit breaker 22. The opposite terminal of the winding of closing magnet 51 is connected over auxiliary contacts 29 (closed when the circuit breaker 22 is open and open when the circuit breaker is fully closed) and over conductor 52 to the control power source. The operations of this system are as follows:

Normally the circuit breaker 11 is closed and feeds energy from the normal source at line 12 to the individual feeder circuits and loads such as 15 and 16. At this time circuit breaker 22 is open, thus disconnecting the emergency source from the feeder and load circuits.

In the event of a failure at the normal source of supply, the voltage across the buses 12 will drop below a predetermined value and the undervoltage relay 46 will be de-energized and its solenoid will thereupon operate to effect closing of the contacts 45 and 47. As a result of the closing of contacts 45 an obvious energizing circuit will be completed over the contacts 45 and the auxiliary contact 41 of circuit breaker 11 for energizing the trip coil 43. Trip coil 43 will thereupon operate its solenoid, withdrawing it from the latch 44 and the spring on the circuit breaker 11 will operate to open the circuit breaker.

This will disconnect the normal supply source from the load circuits. At the same time it will de-energize the trip winding 43 by the opening of contacts 41 and will complete an energizing circuit for the closing magnet 51 of circuit breaker 22 over an obvious energizing circuit from the control power source 35 over contacts 47 of undervoltage relay 46 and auxiliary contact 42 of the circuit breaker 11 to the closing magnet 51 and line 52. Energizing of the closing magnet 51 will operate the circuit breaker 22 to close its contacts connecting the emergency source 21 to the loads.

A further result of the opening of circuit breaker 11 is to complete an energizing circuit for the trip coils 31 and 32 of circuit breakers 17 and 18, respectively, over obvious energizing circuits from the control power source 35 over conductor 36 through winding 31 and 32 in parallel over closed auxiliary contacts 25 and 26 through the closed auxiliary contacts 23 of circuit breaker 11 and the closed auxiliary contacts 24 of circuit breaker 22 (the latter auxiliary contacts being closed now that circuit breaker 22 is closed) and over conductor 37. As a result the circuit breakers 17 and 18 will be operated to open their respective contacts, thus disconnecting their loads 15 and 16 which have been designated as non-essential loads. Other loads in the system will of course remain unaffected.

In the above system the operator has no control to determine which of the loads shall receive power from the emergency source. In some instances it is desirable that he have such a control so that he may selectively control any load he may desire to the emergency source. Such an arrangement is disclosed in Figure 2.

In Figure 2 I have shown a circuit breaker 111 which connects a main source of power (not shown) feeding over the lines 112 to the bus 114. Connected to the bus 114 are a series of loads 115 and 116, protected by individual circuit breakers 117 and 118 respectively. Although only two loads are here illustrated, it will be understood, of course, that there may be many other loads. In the illustration here provided the loads 115 and 116 are designated as the non-essential loads and other loads which are essential, it will be understood, connected to bus 114 or a similar feeder, will remain unaffected by the operations to be described.

An emergency source of power feeding over the line 121 is provided with an emergency power supply circuit breaker 122 which, when closed, will feed power to the bus 114.

The circuit breaker 111 is provided with a pair of auxilary contacts 123 which are closed when the circuit breaker 111 is open and are open when the circuit breaker 111 is closed. Circuit breaker 122 is also provided with a pair of auxiliary contacts 124 and 182 which are closed when the circuit breaker 122 is closed and open when the circuit breaker 122 is open. Circuit breakers 117 and 118 are each provided with auxiliary contacts 125, 126, respectively, which are closed when their respective circuit breakers are closed and open when their respective circuit breakers are open.

Circuit breakers 117 and 118 are also provided with latching mechanisms for holding the respective circuit breakers in contact engagement position against individual biasing springs in a manner well known in the art, until the latches are released by the energization of their individual trip magnets 131 and 132. It will be understood that all the circuit breakers here shown are schematically illustrated and are provided with the usual closing and tripping mechanism, as for example, illustrated in Patent No. 2,348,228. A control source of power 135 feeds energy over the conductors 136 and 137 for the operating mechanisms of the circuit breakers.

The circuit breaker 111, in addition to the auxiliary contacts 123, is provided with auxiliary contacts 141, which are normally closed when the circuit breaker is closed and open when the circuit breaker is open. The circuit breaker is also provided with a set of auxiliary pairs of contacts 181 and 142 which are open when the circuit breaker is closed and closed when the circuit breaker is open. The auxiliary contacts 141 are connected to the winding of a trip magnet 143 which is provided with a plunger engaging a latch 144 on the circuit breaker 111. Auxiliary contacts 141 are also connected to the contacts 145 of an undervoltage relay 146 connected across the normal supply source at buses 112. The undervoltage relay 146 is also supplied with contacts 147 which are connected at one terminal to the control power source 135 and at the opposite terminal to the auxiliary contacts 142 of circuit breaker 111. The auxiliary contacts 142 are connected over a conductor 128 to a closing magnet 151 of the circuit breaker 122. The opposite terminal of the winding of closing magnet 151 is connected over conductor 152 to the control power source. The operations of this system are as follows:

Normally the circuit breaker 111 is closed and feeds energy from the normal source at buses 112 to the individual feeder circuits and loads such as 115 and 116. At this time circuit breaker 122 is open, thus disconnecting the emergency source from the feeder and load circuits.

In the event of a failure at the normal source of supply, the voltage across the buses 112 will drop below a predetermined value and the undervoltage relay 146 will be de-energized and its solenoid will thereupon operate to effect closing of the contacts 145 and 147. As a result of the closing of contacts 145 an obvious energizing circuit will be completed over the contacts 145 and the auxiliary contact 141 of circuit breaker 111 for energizing the trip coil 143. Trip coil 143 will thereupon operate its solenoid, withdraw it from the latch 144 and the spring on the circuit breaker 111 will operate to open the circuit breaker. This will disconnect the normal supply source from the load circuits. At the same time it will de-energize the trip winding 143 by the opening of contacts 141 and will complete an energizing circuit for the closing magnet 151 of circuit breaker 122 over an obvious energizing circuit from the control power source 135 over contacts 147 of undervoltage relay 146 and auxiliary contact 142 of the circuit breaker 111 to the closing magnet 151 and line 152. Energizing of the closing magnet 151 will operate the circuit breaker 122 to close its contacts connecting the emergency source 121 to the loads.

Other loads in the system will of course remain unaffected.

It will be noted that up to this point the circuit breaker and its operation are identical with that described in connection with Figure 1. However, in the present application applicant has provided an additional pair of relays 161 and 162, each provided with its individual solenoid and contacting members 163 and 164 for the relay 161 and 165 for the relay 162. In addition, the feeder circuit breakers 117 and 118 have been provided with auxiliary contacts 171 and 172 for circuit breaker 117 and auxiliary contacts 173 and 174 for circuit breaker 118. When now, in the manner described above, the circuit breaker 111 is opened and circuit breaker 112 is closed, an energizing circuit is completed for the relay winding 162 over the contacts 163 of relay 161 and over the auxiliary contacts 181 of circuit breaker 111 and auxiliary contacts 182 of circuit breaker 122. Energization of the relay 162 will result in the closing of the contacts 165 which completes energizing circuits for the trip coils of the two feeder circuit breakers 117 and 118 and these two circuit breakers controlling energy fed to the non-essential loads are opened.

The opening of the circuit breakers 117 and 118 will now complete an energizing circuit for the relay 161 over the contacts 174 and 172 of circuit breakers 118 and 117, respectively, which are now in open position and over the contacts 181 of circuit breaker 111 (now open) and contact 182 of circuit breaker 122 (now closed). Energization of the relay 161 will result in the closing contacts 164 which completes a self-locking circuit for the relay 161. It will also, however, open the contacts 163.

The closing of the self-locking contacts 164 provides an energizing circuit for the relay 161 which is now independent of the condition of the load circuit breakers 117 and 118 so that irrespective of whether these circuit breakers are open or closed, relay 161 will remain energized so long as circuit breaker 111 is open and circuit breaker 112 remains closed.

This, it will be noted at the outset, is a distinction over the circuit arrangement shown in Figure 1. In Figure 1, the energizing circuits for the respective trip coils of circuit breakers 17 and 18 are completed over their own auxiliary contacts. Thus it is impossible for an operator to close either circuit breaker 17 or 18 so long as circuit breaker 11 is open and circuit breaker 22 closed. Each time the operator attempts to close the circuit for either circuit breaker 17 or 18, their individual trip coils are immediately energized to trip the circuit breaker.

In the modification shown in Figure 2 upon the opening of contacts 163, the relay 162 is de-energized and there is no longer a prepared energizing circuit for the trip coils of circuit breakers 117 and 118 over contacts 165. The operator may now manually reclose these circuit breakers by completing the energizing circuit for their respective closing magnets or by manual operation (not shown) in the manner well known in the art. Closing either one or both of these can be achieved without completing the circuits for the trip coils, although their trip coils were in the first instant energized when switching from the main or normal power supply to the auxiliary power supply occurred.

This, as will now be clear, is achieved by the provision of the relays 161 and 162. Normally the trip coils of the circuit breakers 117 and 118 were prepared for energization over circuits controlled by the relay 162 which relay was energized when the transfer occurred. However, upon completion of the transfer and the opening of the two non-essential circuit breakers, relay 161 is locked energized and in turn opens the circuit for the relay 162.

Although I have shown several illustrations of circuit diagrams for carrying out my invention, I wish to be limited only by the appended claims.

I claim:

1. In an electrical system having a first and a second source of power for feeding electrical energy to loads, including loads designated non-essential; a first circuit breaker having an open and a closed position for controlling energy supply from said first source of power; a second circuit breaker having an open and a closed position for controlling energy supply from said second source of power; a trip magnet operable when energized to trip said first circuit breaker; a closing magnet operable when energized for operating said second circuit breaker to its closed position; an undervoltage relay operable responsive to a voltage failure of said first source for completing an energizing circuit for said trip magnet, an energizing circuit for said closing magnet controlled by the operation of said first circuit breaker to its open position and the operation of said undervoltage relay for operating said second circuit breaker to its closed position; a circuit breaker for each of said designated non-essential loads, each having an open and a closed position; a trip magnet for each of said last mentioned circuit breakers; a first relay; a second relay, said first relay having an energizing circuit therefor completed over the contacts of said second relay when de-energized and contacts of said first circuit breaker in its open position and contacts of said second circuit breaker in its closed position; energizing circuits for said trip magnets of said circuit breakers of said non-essential loads controlled by the energization of said first relay and said first circuit breaker in its open position and second circuit breaker in its closed position; an energizing circuit for said second relay effected by said circuit breakers for said non-essential loads in their open position, and said first circuit breaker in open position and said second circuit breaker in closed position; said second relay when energized de-energizing said first relay to permit reclosing of said circuit breakers for said non-essential loads and a self-locking circuit for said first relay controlled by said first circuit breaker in open position and said second circuit breaker in closed position.

2. In an electrical system having a first and a second source of power for feeding electrical energy to loads, including loads designated non-essential; a first circuit breaker having an open and a closed position for controlling energy supply from said first source of power; a second circuit breaker having an open and a closed position for controlling energy supply from said second source of power; a trip magnet operable when energized to trip said first circuit breaker; a closing magnet operable when energized for operating said second circuit breaker to its closed position; an undervoltage relay operable responsive to a voltage failure of said first source for completing an energizing circuit for said trip magnet, an energizing circuit for said closing magnet controlled by the operation of said first circuit breaker to its open position for operating said second circuit breaker to its closed position; a circuit breaker for each of said designated non-essential loads, each having an open and a closed position; a trip magnet for each of said last mentioned circuit breakers; a first relay; a second relay, said first relay having an energizing circuit therefor completed over the contacts of said second relay when de-energized and contacts of said first circuit breaker in its open position and contacts of said second circuit breaker in its closed position; energizing circuits for said trip magnets of said circuit breakers of said non-essential loads controlled by the energization of said first relay and said first circuit breaker in its open position and second circuit breaker in its closed position; an energizing circuit for said second relay effected by said circuit breakers for said non-essential loads in their open position, and said first circuit breaker in open position and said second circiut breaker in closed position; said second relay when energized de-energizing said first relay to permit reclosing of said circuit breakers for said non-essential loads and a self-locking circuit for said first relay controlled by said first circuit breaker in open position and said second circuit breaker in closed position.

3. In an electrical system having a first and a second source of power for feeding electrical energy to loads, including loads designated non-essential; a first circuit breaker having an open and a closed position for controlling energy supply from said first source of power; a second circuit breaker having an open and a closed position for controlling energy supply from said second source of power; a trip magnet operable when energized to trip said first circuit breaker; a closing magnet operable when energized for operating said second circuit breaker to its closed position; an undervoltage relay operable responsive to a voltage failure of said first source for completing an energizing circuit for said trip magnet, an energizing circuit for said closing magnet controlled by the operation of said first circuit breaker to its open position and the operation of said undervoltage relay for operating said second circuit breaker to its closed position; a circuit breaker for each of said designated non-essential loads, each having an open and a closed position; a trip magnet for each of said last mentioned circuit breakers; a first relay; a second relay, said first relay having an energizing circuit therefor completed over contacts of said first circuit breaker in its open position and contacts of said second circuit breaker in its closed position; energizing circuits for said trip magnets of said circuit breakers of said non-essential loads controlled by the energization of said first relay and said first circuit breaker in its open position and second circuit breaker in its closed position; an energizing circuit for said second relay effected by said circuit breakers for said non-essential loads in their open position, and said first circuit breaker in open position and said second circuit breaker in closed poistion; said second relay when energized de-energizing said first relay to permit reclosing of said circuit breakers for said non-essential loads and a self-locking circuit for said first relay controlled by said first circuit breaker in open position and said second circuit breaker in closed position.

4. In an electrical system having a first and a second source of power for feeding electrical energy to loads including loads designated non-essential; a first circuit breaker having an open and a closed position for controlling energy supply from said first source of power; a second circuit breaker having an open and a closed position for controlling energy supply from said second source of power; a trip magnet operable when energized to trip said first circuit breaker; a closing magnet operable when energized for operating said second circuit breaker to its closed position; means including an undervoltage relay operable responsive to a voltage failure of said first source for completing an energizing circuit for said trip magnet and the energizing circuit for said closing magnet for operating said second circuit breaker to its closed position; a circuit breaker for each of said designated non-essential loads, each circuit breaker having an open and a closed position; a trip magnet for each of said last mentioned circuit breakers; a first relay; a second relay; means controlled by said first circuit breaker for energizing said first relay; energizing circuits for said trip magnets of said circuit breakers of said non-essential loads controlled by the energization of said first relay and said first circuit breaker in its open position; means responsive to the operation of said circuit breakers for said non-essential loads for energizing said second relay; said second relay when energized de-energizing said first relay to permit reclosing of said circuit breakers for said non-essential loads and a self-locking circuit for said first relay.

5. In an electrical system having a first and a second source of power for feeding electrical energy to loads including loads designated non-essential; a first circuit breaker having an open and a closed position for controlling energy supply from said first source of power; a second circuit breaker having an open and a closed position for controlling energy supply from said second source of power; a trip magnet operable when energized to trip said first circuit breaker; a closing magnet operable when energized for operating said second circuit breaker to its closed position; means including an undervoltage relay operable responsive to a voltage failure of said first source for completing an energizing circuit for said trip magnet and the energizing circuit for said closing magnet for operating said second circuit breaker to its closed position; a circuit breaker for each of said designated non-essential loads, each circuit breaker having an open and a closed position; a trip magnet for each of said last mentioned circuit breakers; a first relay; a second relay; means controlled by said first circuit breaker for energizing said first relay; energizing circuits for said trip magnets of said circuit breakers of said non-essential loads controlled by the energization of said first relay; means responsive to the operation of said circuit breaker for said non-essential loads for energizing said second relay; said second relay when energized de-energizing said first relay to permit reclosing of said circuit breakers for said non-essential loads and a self-locking circuit for said first relay.

6. In an electrical system having a first and a second source of power for feeding electrical energy to loads including loads designated non-essential; a first circuit breaker having an open and a closed position for controlling energy supply from said first source of power; a second circuit breaker having an open and a closed position for controlling energy supply from said second source of power; a trip magnet operable when energized to trip said first circuit breaker; a closing magnet operable when energized for operating said second circuit breaker to its closed position; means including an undervoltage relay operable responsive to a voltage failure of said first source for completing an energizing circuit for said trip magnet and the energizing circuit for said closing magnet for operating said second circuit breaker to its closed position; a circuit breaker for each of said designated non-essential loads, each circuit breaker having an open and a closed position; a trip magnet for each of said last mentioned circuit breakers; means controlled by the opening of said first circuit breaker for operating said last mentioned trip magnets; means operable following the opening of said circuit breakers for said non-essential loads for locking open said energizing circuits for said trip magnets; and closing mechanism for reclosing said last mentioned circuit breakers.

7. In an electrical system having a first and a second source of power for feeding electrical energy to loads including loads designated non-essential; a first circuit breaker having an open and a closed position for controlling energy supply from said first source of power; a second circuit breaker having an open and a closed position for controlling energy supply from said second source of power; a trip magnet operable when energized to trip said first circuit breaker; a closing magnet operable when energized for operating said second circuit breaker to its closed position; means including an undervoltage relay operable responsive to a voltage failure of said first source for completing an energizing circuit for said trip magnet and the energizing circuit for said closing magnet for operating said second circuit breaker to its closed position; a circuit breaker for each of said designated non-essential loads, each circuit breaker having an open and a closed position; a trip magnet for each of said last mentioned circuit breakers; means controlled by the opening of said first circuit breaker for operating said last mentioned trip magnets; and means operable following the opening of said circuit breakers for said non-essential loads for locking open said energizing circuits for said trip magnets.

8. In an electrical system having a first and a second source of power for feeding electrical energy to loads including loads designated non-essential; a first circuit breaker having an open and a closed position for controlling energy supply from said first source of power; a second circuit breaker having an open and a closed position for controlling energy supply from said second source of power; a trip magnet operable when energized to trip said first circuit breaker to its open position; a closing magnet operable when energized for operating said second circuit breaker to its closed position; an undervoltage relay operable responsive to a voltage failure of said first source for completing an energizing circuit for said trip magnet to operate said first circuit breaker to its open position; an energizing circuit for said closing magnet controlled by the operation of said first circuit breaker to its open position and the operation of said undervoltage relay, said closing magnet when energized operating said second circuit breaker to its closed position; a circuit breaker for each of said designated non-essential loads, each circuit breaker having an open and a closed position; a trip magnet for each of said last mentioned circuit breakers; means controlled by the opening of said first circuit breaker for operating said last mentioned trip magnets; means operable following the opening of said circuit breakers for said non-essential loads for locking open said energizing circuits for said trip magnets; and closing mechanism for reclosing said last mentioned circuit breakers.

9. In an electrical system having a first and a second source of power for feeding electrical energy to loads including loads designated non-essential; a first circuit breaker having an open and a closed position for controlling energy supply from said first source of power; a second circuit breaker having an open and a closed position for controlling energy supply from said second source of power; a trip magnet operable when energized to trip said first circuit breaker to its open position; a closing magnet operable when energized for operating said second circuit breaker to its closed position; an undervoltage relay operable responsive to a voltage failure of said first source for completing an energizing circuit for said trip magnet to operate said first circuit breaker to its open position; an energizing circuit for said closing magnet controlled by the operation of said first circuit breaker to its open position and the operation of said undervoltage relay, said closing magnet when energized operating said second circuit breaker to its closed position; a circuit breaker for each of said designated non-essential loads, each circuit breaker having an open and a closed position; a trip magnet for each of said last mentioned circuit breakers; means controlled by the opening of said first circuit breaker for operating said last mentioned trip magnets; and means operable following the opening of said circuit breakers for said non-essential loads for locking open said energizing circuits for said trip magnets.

10. In an electrical system having a first and a second source of power for feeding electrical energy to loads including loads designated non-essential; a first circuit breaker having an open and a closed position for controlling energy supply from said first source of power; a second circuit breaker having an open and a closed position for controlling energy supply from said second source of power; an electric trip device operable when energized to trip said first circuit breaker to its open position; a closing magnet operable when energized for operating said second circuit breaker to its closed position; an undervoltage relay operable responsive to a voltage failure of said first source for completing an energizing circuit for said electric trip device to operate said first circuit breaker to its open position; an energizing circuit for said closing magnet controlled by the operation of said first circuit breaker to its open position and the operation of said undervoltage relay, said closing magnet when energized operating said second circuit breaker to its closed position; a circuit breaker for each of said designated non-essential loads, each circuit breaker having an open and a closed position; an electric trip device for each of said last mentioned circuit breakers; a first relay; a second relay; said first relay having an energizing circuit therefor effected by said second relay de-energized, said first circuit breaker in its open position and said second circuit breaker in its closed position; energizing circuits for said electric trip devices of said circuit breakers of said non-essential loads controlled by the energization of said first relay and said first circuit breaker in its open position and second circuit breaker in its closed position; an energizing circuit for said second relay effected by said circuit breakers for said non-essential loads in their open position, and said first circuit breaker in open position and said second circuit breaker in closed position, said second relay when energized opening the energizing circuit of said first relay to permit reclosing of said circuit breakers for said non-essential loads and a self-locking circuit for said first relay controlled by said first circuit breaker in open position and said second circuit breaker in closed position.

11. In an electrical system having a first and a second source of power for feeding electrical energy to loads including loads designated non-essential; a first circuit breaker having an open and a closed position for controlling energy supply from said first source of power; a second circuit breaker having an open and a closed position for controlling energy supply from said second source of power; a trip magnet operable when energized to trip said first circuit breaker to its open position; a closing magnet operable when energized for operating said second circuit breaker to its closed position; an undervoltage relay operable responsive to a voltage failure of said first source for completing an energizing circuit for said trip magnet to operate said first circuit breaker to its open position; an energizing circuit for said closing magnet controlled by the operation of said first circuit breaker to its open position and the operation of said undervoltage relay, said closing magnet when energized operating said second circuit breaker to its closed position; a circuit breaker for each of said designated non-essential loads, each circuit breaker having an open and a closed position; a trip magnet for each of said last mentioned circuit breakers; a first relay; a second relay; said first relay having an energizing circuit therefor effected by said second relay de-energized, said first circuit breaker in its open position and said second circuit breaker in its closed position; energizing circuits for said trip magnets of said circuit breakers of said non-essential loads controlled by the energization of said first relay and said first circuit breaker in its open position and second circuit breaker in its closed position; an energizing circuit for said second relay effected by said circuit breakers for said non-essential loads in their open position, and said first circuit breaker in open position and said second circuit breaker in closed position, said second relay when energized opening the energizing circuit of said first relay to permit reclosing of said circuit breakers for said non-essential loads and a self-locking circuit for said first relay controlled by said first circuit breaker in open position and said second circuit breaker in closed position.

12. In an electrical system having a first and a second source of power for feeding electrical energy to loads including loads designated non-essential; a first circuit breaker having an open and a closed position for controlling energy supply from said first source of power; a second circuit breaker having an open and a closed position for controlling energy supply from said second source of power; a trip magnet operable when energized to trip said first circuit breaker to its open position; a closing magnet operable when energized for operating said second circuit breaker to its closed position; an undervoltage relay operable responsive to a voltage failure of said first source for completing an energizing circuit for said trip magnet to operate said first circuit breaker to its open position; an energizing circuit for said closing magnet controlled by the operation of said first circuit breaker to its open position, said closing magnet when energized operating said second circuit breaker to its closed position; a circuit breaker for each of said designated non-essential loads, each circuit breaker having an open and a closed position; a trip magnet for each of said last mentioned circuit breakers; a first relay; a second relay; said first relay having an energizing circuit therefor affected by said first circuit breaker in its open position and said second circuit breaker in its closed position; energizing circuits for said trip magnets of said circuit breakers of said non-essential loads controlled by the energization of said first relay and said first circuit breaker in its open position and second circuit breaker in its closed position; an energizing circuit for said second relay effected by said circuit breakers for said non-essential loads in their open position, and said first circuit breaker in open position and said second circuit breaker in closed position, said second relay when energized opening the energizing circuit of said first relay to permit reclosing of said circuit breakers for said non-essential loads and a self-locking circuit for said first relay controlled by said first circuit breaker in open position and said second circuit breaker in closed position.

13. In an electrical system having a first and a second source of power for feeding electrical energy to loads including loads designated non-essential; a first circuit breaker having an open and a closed position for controlling energy supply from said first source of power; a second circuit breaker having an open and a closed position for controllng energy supply from said second source of power; a trip magnet operable when energized to trip said first circuit breaker; a closing magnet operable when energized for operating said second circuit breaker to its closed position; means including an undervoltage relay operable responsive to a voltage failure of said first source for completing an energizing circuit for said trip magnet; and the energizing circuit for said closing magnet for operating said second circuit breaker to its closed position; a circuit breaker for each of said designated non-essential loads, each circuit breaker having an open and a closed position; a trip magnet for each of said last mentioned circuit breakers; a first relay; a second relay; said first relay having an energizing circuit therefor effected by said first circuit breaker in its open position and said second circuit breaker in its closed position; energizing circuits for said trip magnets of said circuit breakers of said non-essential loads controlled by the energization of said first relay and said first circuit breaker in its open position and second circuit breaker in its closed position; an energizing circuit for said second relay effected by said circuit breakers for said non-essential loads in their open position, and said first circuit breaker in open position and said second circuit breaker in closed position, said second relay when energized de-energizing said first relay to permit reclosing of said circuit breakers for said non-essential loads and a self-locking circuit for said first relay controlled by said first circuit breaker in open position and said second circuit breaker in closed position.

AMADO CONANGLA.

No references cited.